US010999875B2

(12) United States Patent
Li et al.

(10) Patent No.: US 10,999,875 B2
(45) Date of Patent: May 4, 2021

(54) RANDOM ACCESS METHOD AND APPARATUS

(71) Applicant: Huawei Technologies Co., Ltd., Shenzhen (CN)

(72) Inventors: Xiaocui Li, Beijing (CN); Guorong Li, Shenzhen (CN); Kai Xu, Shenzhen (CN); Lili Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/608,508

(22) PCT Filed: May 31, 2017

(86) PCT No.: PCT/CN2017/086612
§ 371 (c)(1),
(2) Date: Oct. 25, 2019

(87) PCT Pub. No.: WO2018/196092
PCT Pub. Date: Nov. 1, 2018

(65) Prior Publication Data
US 2020/0196354 A1 Jun. 18, 2020

(30) Foreign Application Priority Data
Apr. 25, 2017 (CN) .......................... 201710277625.6

(51) Int. Cl.
*H04W 74/08* (2009.01)
*H04W 72/04* (2009.01)
*H04W 76/27* (2018.01)

(52) U.S. Cl.
CPC ... *H04W 74/0833* (2013.01); *H04W 74/0808* (2013.01); *H04W 76/27* (2018.02)

(58) Field of Classification Search
None
See application file for complete search history.

(56) References Cited

U.S. PATENT DOCUMENTS

2008/0253320 A1* 10/2008 Piggin ................... H04W 16/14
370/329
2016/0234861 A1 8/2016 Ye et al.
(Continued)

FOREIGN PATENT DOCUMENTS

CN 102740374 A 10/2012
CN 105873229 A 8/2016
(Continued)

OTHER PUBLICATIONS

Machine Translation and Abstract of Chinese Publication No. CN106160967, Nov. 23, 2016, 31 pages.
(Continued)

*Primary Examiner* — Gary Lafontant
(74) *Attorney, Agent, or Firm* — Conley Rose, P.C.

(57) ABSTRACT

A random access method and an apparatus include performing listen before talk (LBT) on a first carrier, detecting a first signal on the first carrier when the terminal determines, through the LBT, that the first carrier is in a busy state, where the first carrier includes an unlicensed carrier, the first signal includes a first preamble signal or indication information, and the indication information indicates that the first carrier sends the first preamble signal, and sending a second preamble signal on the first carrier to attempt to access a base station when the terminal detects the first preamble signal or the indication information.

20 Claims, 8 Drawing Sheets

(56) References Cited

U.S. PATENT DOCUMENTS

| | | | |
|---|---|---|---|
| 2017/0238272 A1* | 8/2017 | You | H04L 5/0082 |
| | | | 370/350 |
| 2018/0054835 A1* | 2/2018 | Fodor | H04W 74/0816 |
| 2018/0192442 A1 | 7/2018 | Li et al. | |
| 2018/0279347 A1 | 9/2018 | Wang et al. | |
| 2019/0116614 A1* | 4/2019 | Li | H04W 74/085 |
| 2019/0124687 A1* | 4/2019 | Yang | H04L 27/0006 |

FOREIGN PATENT DOCUMENTS

| | | |
|---|---|---|
| CN | 106160967 A | 11/2016 |
| CN | 106453182 A | 2/2017 |
| CN | 106559844 A | 4/2017 |
| CN | 106559908 A | 4/2017 |
| KR | 20170042627 A | 4/2017 |
| WO | 2016163845 A1 | 10/2016 |
| WO | 2016206483 A1 | 12/2016 |

OTHER PUBLICATIONS

3GPP TS 36321 V14.2.0, "3rd Generation Partnership Project; Technical Specification Group Radio Access Network; Evolved Universal Terrestrial Radio Access (E-UTRA); Medium Access Control (MAC) protocol specification (Release 14)," Mar. 2017, 106 pages.

3GPP TS 36331 V14.2.2, "3rd Generation Partnership Project; Technical Specification Group Radio Access Network; Evolved Universal Terrestrial Radio Access (E-UTRA); Radio Resource Control (RRC); Protocol specification (Release 14)," Apr. 2017, 721 pages.

Foreign Communication From a Counterpart Application, PCT Application No. PCT/CN2017/086612, English Translation of International Search Report dated Jan. 31, 2018, 2 pages.

Foreign Communication From a Counterpart Application, PCT Application No. PCT/CN2017/086612, English Translation of Written Opinion dated Jan. 31, 2018, 4 pages.

* cited by examiner

Configuration 0: | CP | First sequence | GT |

Configuration 1: | CP | First sequence | GT |

Configuration 2: | CP | First sequence | Second sequence | GT |

Configuration 3: | CP | First sequence | Second sequence | GT |

RANDOM ACCESS METHOD AND APPARATUS

CROSS-REFERENCE TO RELATED APPLICATIONS

This application is a U.S. National Stage of International Patent Application No. PCT/CN2017/086612 filed on May 31, 2017, which claims priority to Chinese Patent Application No. 201710277625.6 filed on Apr. 25, 2017. Both of the aforementioned applications are hereby incorporated by reference in their entireties.

TECHNICAL FIELD

This application relates to the communications field, and in particular, to a random access method and an apparatus.

BACKGROUND

Figure 1:
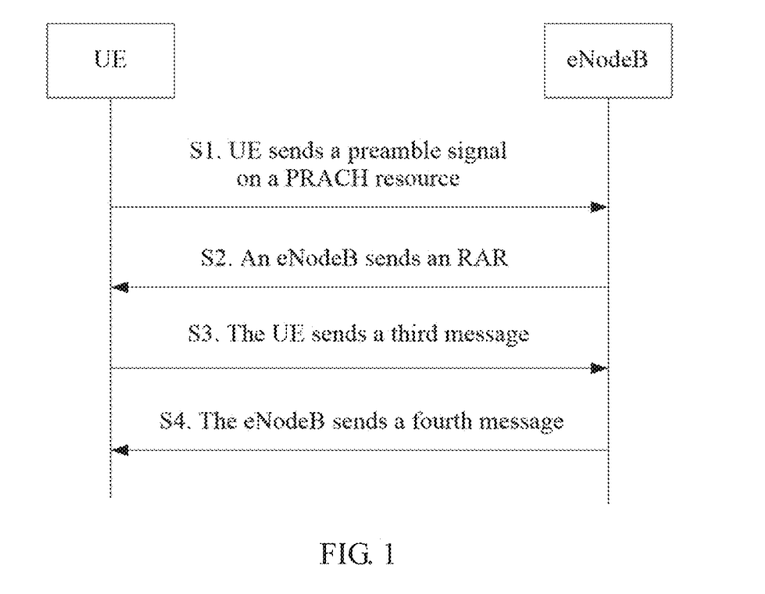
FIG. 1 is a signaling interaction diagram of a contention-based random access process according to an embodiment of this application.

In conventional Long Term Evolution (Long Term Evolution, LTE), a contention-based random access process is shown in FIG. 1, including the following steps: S1. User equipment (User Equipment, UE) selects a preamble signal index (Preamble index) and a physical random access channel (Physical Random Access Channel, PRACH) resource that is used to send a preamble signal (preamble), and sends the preamble on the resource. S2. An evolved NodeB (evolved NodeB, eNodeB) sends a random access response (Random Access Response, RAR) to the UE. S3. The UE sends a third message (a message 3) to the eNodeB. S4. The eNodeB sends a fourth message (a message 4) to the UE, so that a terminal accesses the eNodeB. Different UEs may select a same PRACH resource to send preambles.

The PRACH resource may include a licensed spectrum (licensed spectrum) and an unlicensed spectrum (unlicensed spectrum). For a commercial radio communications system, an operator needs to obtain the licensed spectrum through auction. After obtaining authorization, a user can carry out a radio communication operation activity by using a corresponding spectrum. The unlicensed spectrum does not need to be obtained through auction. Anyone can be authorized to use these frequency bands, for example, using a Wireless Fidelity (Wireless Fidelity, Wi-Fi) device on 2.4 GHz and 5 GHz frequency bands. Generally, a carrier on the licensed spectrum is referred to as a licensed carrier, and a carrier on the unlicensed spectrum is referred to as an unlicensed carrier.

If UE sends a preamble by using an unlicensed carrier, the UE can send the preamble only after successfully performing listen before talk (Listen Before Talk, LBT). If any UE successfully performs LBT, another UE detects that the carrier is in a busy state, and cannot send a corresponding preamble signal. Therefore, how to enable more UEs to simultaneously send preamble signals by using an unlicensed carrier is a problem that needs to be resolved urgently.

SUMMARY

Embodiments of this application provide a random access method and an apparatus, to resolve a problem that a plurality of UEs cannot simultaneously send preamble signals during random access.

According to an aspect, an embodiment of this application provides a random access method, including: performing, by a terminal, LBT on a first carrier; detecting, by the terminal, a first signal on the first carrier if the terminal determines, through the LBT, that the first carrier is in a busy state, where the first carrier includes an unlicensed carrier, the first signal includes a first preamble signal or indication information, and the indication information is used to indicate that the first carrier is used to send the first preamble signal; and if the terminal detects the first preamble signal or the indication information, sending, by the terminal, a second preamble signal to a base station on the first carrier to attempt to access the base station. In this way, when the terminal determines, through the LBT, that the first carrier is in a busy state, the terminal may detect the first preamble signal or the indication information on the first carrier. If the terminal detects the first preamble signal or the indication information, the terminal may send the second preamble signal to the base station on the first carrier to attempt to access the base station. This ensures that a plurality of terminals can simultaneously send different preamble signals on a same carrier. In comparison with the prior art in which a corresponding preamble signal cannot be sent when it is determined, through LBT, that a first carrier is in a busy state, in this embodiment of this application, a problem that a plurality of UEs cannot simultaneously send preamble signals can be resolved.

In a possible design, before the performing, by a terminal, listen before talk LBT on a first carrier, the method further includes: receiving, by the terminal, a radio resource control (Radio Resource Control, RRC) configuration message sent by the base station, where the RRC configuration message is used to instruct the terminal to detect the first preamble signal when the first carrier is in a busy state, or the RRC configuration message is used to instruct the terminal to detect the indication information when the first carrier is in a busy state. In this way, the terminal may set an LBT working mode of the terminal based on the RRC configuration message. To be specific, if the terminal detects that the first carrier is in a busy state, the terminal may further detect whether the first carrier is used to send the first preamble signal or detect the indication information, so that the terminal determines whether the terminal can send the second preamble signal on the first carrier.

In a possible design, the method further includes: receiving, by the terminal, a RAR message on a second carrier, where the second carrier includes a licensed carrier. In this way, the base station may send the RAR message to the terminal by using the licensed carrier, so that the base station does not need to perform LBT on the unlicensed carrier, thereby improving a success rate of sending the RAR message.

In a possible design, before the receiving, by the terminal on a second carrier, a random access response RAR message sent by the base station, the method further includes: receiving, by the terminal, a system broadcast message from the base station, where the system broadcast message is used to instruct the terminal to add a predetermined time offset before a RAR time window, so that the terminal receives the RAR message when the RAR time window to which the time offset is added arrives. In this way, the terminal may add the time offset to the RAR time window based on the system broadcast message, thereby preventing a random access failure caused by a case in which the RAR time window is too short to receive the RAR message within the RAR time window.

In a possible design, the method further includes: sending, by the terminal, a message 3 to the base station by using a third carrier, where the third carrier includes a carrier of at least one cell in a time advanced group TAG of the base station. In this way, the terminal may send the message 3 on the carrier of the at least one cell, thereby improving a success rate of sending the message 3 by the terminal.

In a possible design, the method further includes: receiving, by the terminal, a message 4 from the base station by using the first carrier, where the message 4 is received after a window of a contention resolution timer is prolonged by a preset time period, the preset time period is determined based on a detection time required by the LBT and/or a forwarding time of the RAR message, and the forwarding time of the RAR message is used to indicate duration of forwarding the RAR message from the first carrier to the second carrier. In this way, the window of the contention resolution timer of the terminal may be prolonged based on the detection time required by the LBT and/or the forwarding time of the RAR message, thereby improving a success rate of receiving the message 4 by the terminal.

According to another aspect, an embodiment of this application provides a terminal, including: an execution unit, configured to perform LBT on a first carrier; a detection unit, configured to detect a first signal on the first carrier if it is determined, through the LBT, that the first carrier is in a busy state, where the first carrier includes an unlicensed carrier, the first signal includes a first preamble signal or indication information, and the indication information is used to indicate that the first carrier is used to send the first preamble signal; and a sending unit, configured to: if the first preamble signal or the indication information is detected, send a second preamble signal to a base station on the first carrier to attempt to access the base station.

In a possible design, the terminal further includes a receiving unit, configured to receive an RRC configuration message sent by the base station, where the RRC configuration message is used to instruct to detect the first preamble signal when the first carrier is in a busy state, or the RRC configuration message is used to instruct to detect the indication information when the first carrier is in a busy state.

In a possible design, the receiving unit is further configured to receive, on a second carrier, a RAR message sent by the base station, where the second carrier includes a licensed carrier.

In a possible design, the receiving unit is further configured to receive a system broadcast message from the base station, where the system broadcast message is used to instruct to add a predetermined time offset before a RAR time window, so that the terminal receives the RAR message when the RAR time window to which the time offset is added arrives.

In a possible design, the sending unit is further configured to send a message 3 to the base station by using a third carrier, where the third carrier includes a carrier of at least one cell in a time advanced group TAG of the base station.

In a possible design, the receiving unit is further configured to receive a message 4 from the base station by using the first carrier, where the message 4 is received after a window of a contention resolution timer is prolonged by a preset time period, the preset time period is determined based on a detection time required by the LBT and/or a forwarding time of the RAR message, and the forwarding time of the RAR message is used to indicate duration of forwarding the RAR message from the first carrier to the second carrier.

According to still another aspect, an embodiment of this application provides a terminal, including: a processor, configured to perform listen before talk LBT on a first carrier, where the processor is further configured to detect a first signal on the first carrier if it is determined, through the LBT, that the first carrier is in a busy state, where the first carrier includes an unlicensed carrier, the first signal includes a first preamble signal or indication information, and the indication information is used to indicate that the first carrier is used to send the first preamble signal; and a transceiver, configured to: if the first preamble signal or the indication information is detected, send a second preamble signal to a base station on the first carrier to attempt to access the base station.

In a possible design, the transceiver is further configured to receive a radio resource control RRC configuration message sent by the base station, where the RRC configuration message is used to instruct the terminal to detect the first preamble signal when the first carrier is in a busy state, or the RRC configuration message is used to instruct the terminal to detect the indication information when the first carrier is in a busy state.

In a possible design, the transceiver is further configured to receive a random access response RAR message on a second carrier, where the second carrier includes a licensed carrier.

In a possible design, the transceiver is further configured to receive a system broadcast message from the base station, where the system broadcast message is used to instruct the terminal to add a predetermined time offset before a RAR time window, so that the terminal receives the RAR message when the RAR time window to which the time offset is added arrives.

In a possible design, the transceiver is further configured to send a message 3 to the base station by using a third carrier, where the third carrier includes a carrier of at least one cell in a time advanced group TAG of the base station.

In a possible design, the transceiver is further configured to receive a message 4 from the base station by using the first carrier, where the message 4 is received after a window of a contention resolution timer is prolonged by a preset time period, the preset time period is determined based on a detection time required by the LBT and/or a forwarding time of the RAR message, and the forwarding time of the RAR message is used to indicate duration of forwarding the RAR message from the first carrier to the second carrier.

According to still another aspect, an embodiment of this application provides a computer storage medium, configured to store a computer software instruction used by the AP and including a program designed for executing the foregoing aspects.

In this way, when the terminal performs the LBT on the first carrier, if the terminal determines, through the LBT, that the first carrier is in a busy state, the terminal may detect the first signal on the first carrier, where the first signal includes the first preamble signal or the indication information. If the terminal detects the first preamble signal or the indication information, the terminal may send the second preamble signal to the base station on the first carrier to attempt to access the base station. This ensures that a plurality of terminals can simultaneously send different preamble signals on a same carrier. In comparison with the prior art in which a corresponding preamble signal cannot be sent when it is determined, through LBT, that a first carrier is in a busy state, in the embodiments of this application, a problem that a plurality of UEs cannot simultaneously send preamble signals can be resolved.

DESCRIPTION OF EMBODIMENTS

Figure 2:
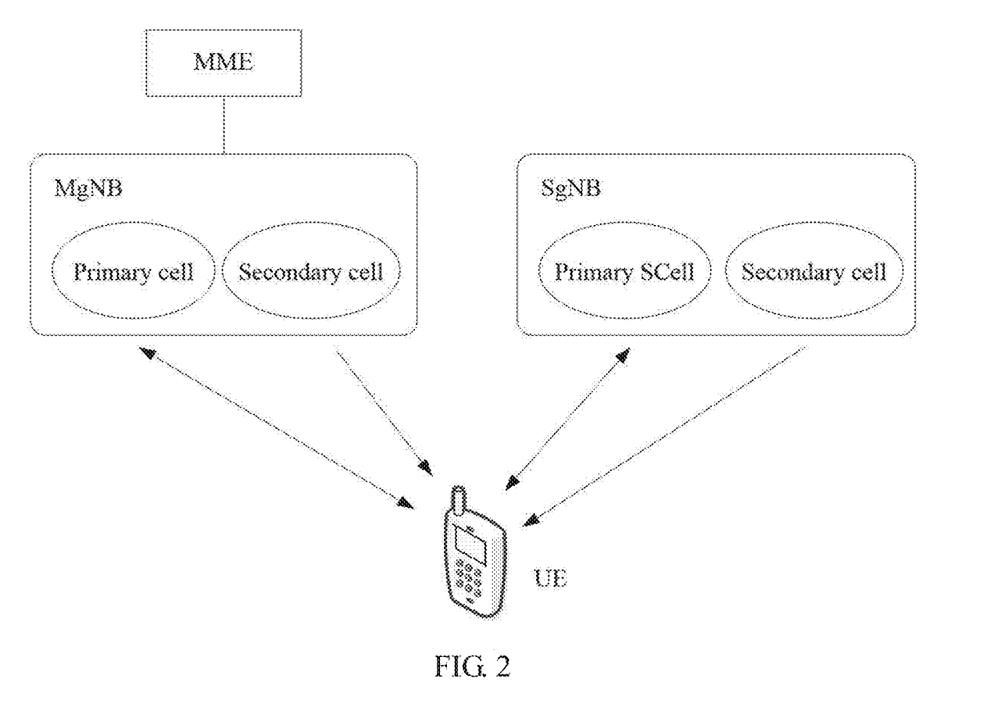
FIG. 2 is a schematic diagram of a system architecture according to an embodiment of this application.

The research project "New SID on NR-based Access to Unlicensed Spectrum (5G-assisted unlicensed spectrum)" on fifth-generation mobile communications technologies (5-Generation, 5G) was successfully established in the 3rd Generation Partnership Project (3rd Generation Partnership Project, 3GPP) Radio Access Network (Radio Access Network, RAN) meeting #75. A dual-connectivity (Dual-Connectivity, DC) architecture supported by the project is shown in FIG. 2. UE may be simultaneously connected to two gNBs (where gNB is a name of a base station in 5G), and the gNBs each can independently manage the UE and radio resources in their respective cells. A gNB connected to an MME is referred to as a master gNB (Master gNB, MgNB), and the other gNB is configured to provide an extra resource and is referred to as a secondary gNB (Secondary gNB, SgNB). The MgNB may include a primary cell (PCell) and a secondary cell (SCell), and the SgNB may include a primary SCell (PSCell) and a secondary cell (SCell). It should be noted that the PSCell and the SCell of the SgNB include only unlicensed carriers, the SCell of the MgNB also includes an unlicensed carrier, and only the PCell of the MgNB includes a licensed carrier. For the SgNB, the PSCell supports contention-based and non-contention-based random access processes, and the SCell supports only a non-contention-based random access process. For the MgNB, the PCell supports contention-based and non-contention-based random access processes, and the SCell supports only a non-contention-based random access process. In the embodiments of this application, the PSCell of the SgNB is used as an example to describe a contention-based random access process performed by the PSCell by using an unlicensed carrier.

The embodiments of this application may be applied to a scenario in which random access is performed by using an unlicensed carrier, for example, applied to a DC scenario, which is a scenario in which the PSCell of the SgNB performs contention-based random access by using an unlicensed carrier. A system architecture in the embodiments of this application is shown in FIG. 2, and may include UE, an SgNB, and an MgNB. Before the UE performs a contention-based random access process with the SgNB by using an unlicensed carrier, the UE needs to perform LBT with a PSCell of the SgNB, and can perform the contention-based random access process only after successfully performing the LBT.

Figure 3:
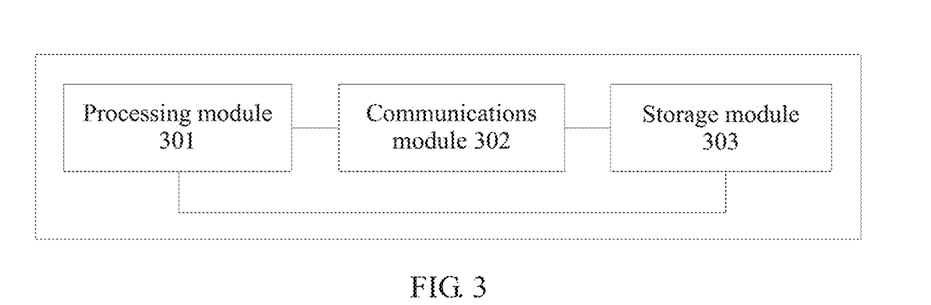
FIG. 3 is a schematic diagram of an internal structure of a terminal according to an embodiment of this application.

FIG. 3 is a schematic diagram of an internal structure of a terminal according to this application. In this application, the terminal may include a processing module 301, a communications module 302, and a storage module 303. The processing module 301 is configured to control hardware apparatuses of all parts, application program software, and the like of the terminal, for example, configured to control a hardware apparatus or an application program for detecting a preamble. The communications module 302 is configured to receive a message sent by a base station or send a message to the base station, and may also send data of the terminal to another device. The storage module 303 is configured to store a software program of the terminal, store data, run software, and the like.

An embodiment of this application provides a random access method. A basic method thereof is as follows: A terminal performs LBT on a first carrier. The terminal detects a first signal on the first carrier if the terminal determines, through the LBT, that the first carrier is in a busy state, where the first signal includes a first preamble or indication information sent by another terminal. If the terminal detects the first signal, the terminal sends a second preamble on the first carrier to attempt to access a base station. To differentiate between preambles sent by different terminals, the first preamble is used to indicate the preamble sent by the another terminal, and the second preamble is used to indicate the preamble sent by the current terminal.

Figure 4:
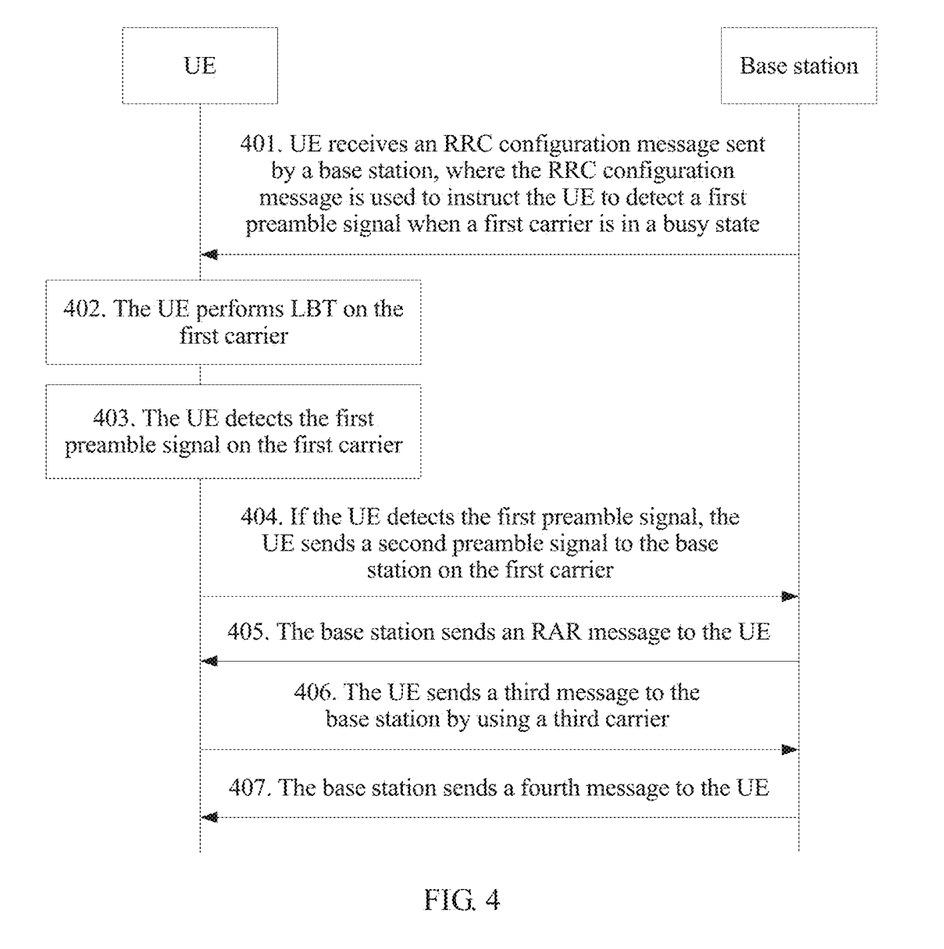
FIG. 4 is a schematic signaling interaction diagram of a random access method according to an embodiment of this application.

The following provides a random access method, and description is provided by using an example in which a terminal is UE and a first signal is a first preamble. As shown in FIG. 4, the method includes the following steps.

401. UE receives an RRC configuration message sent by a base station, where the RRC configuration message is used to instruct the UE to detect a first preamble when a first carrier is in a busy state.

For example, as shown in FIG. 2, assuming that the base station is an SgNB, the UE may receive an RRC configuration message sent by the SgNB. The RRC configuration message may be used to configure a new LBT mode of the UE. LBT is also referred to as carrier sense multiple access (Carrier Sense Multiple Access, CSMA), which is a protocol that allows a plurality of devices to send signals on a same carrier. In the protocol, a device senses whether other devices are busy and sends a signal only when the carrier is idle.

In the new LBT mode, when the UE determines, through the LBT, that a carrier of a PSCell is in a busy state, the UE may further detect the first preamble on the carrier of the PSCell.

In a possible design, when the new LBT mode is set to an "on" state in the RRC configuration message, it indicates that the UE uses the new LBT mode. If the new LBT mode is set to an "off" state, it indicates that the UE cannot use the new LBT mode and can use only a conventional LBT mode, in other words, the UE sends a signal only when the carrier is idle.

402. The UE performs LBT on the first carrier.

When performing the LBT on the first carrier, the UE may assess the first carrier by using clear carrier assessment (Channel Clear Assessment, CCA). For example, the UE may assess carrier energy of the first carrier and compare the carrier energy with a preset threshold. If the carrier energy is less than the preset threshold, it is determined that the carrier is idle. If the carrier energy is greater than the preset threshold, it is determined that the carrier is busy. The preset threshold may be set by the base station.

In an example, which is denoted as an example 1, it is assumed that the first carrier is the carrier of the PSCell of the SgNB. If the UE determines that the carrier of the PSCell is in a busy state, the UE may perform step 403. If the UE determines that the carrier of the PSCell is in an idle state, the UE may directly send a second preamble to attempt to access the base station (namely, the SgNB).

403. The UE detects the first preamble on the first carrier.

Based on the example 1, the UE detects, on the carrier of the PSCell, the first preamble sent by another UE.

Figure 5:
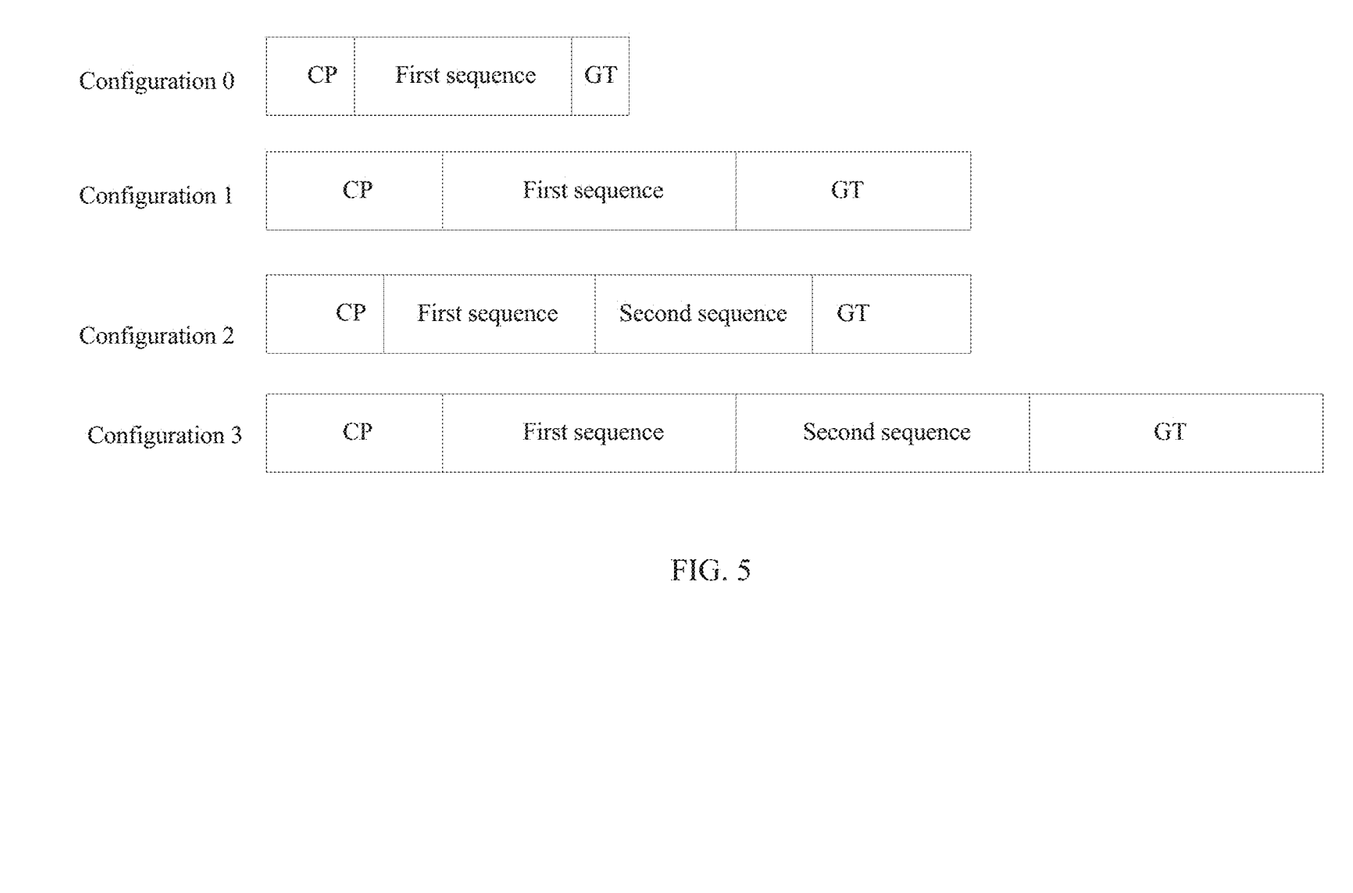
FIG. 5 is a schematic diagram of configurations of a preamble according to an embodiment of this application.

A preamble may have a plurality of configurations. For example, FIG. 5 shows four configurations of a preamble. There may be different CP sequences, first sequences, second sequences, and guard times (Guard Time, GT) for the preamble in different configurations.

A specific process in which the UE detects the first preamble is as follows:

The UE first detects a CP sequence of the first preamble on the carrier of the PSCell, where the UE detects the CP sequence by using a cross-correlation formula. The cross-correlation formula indicates a degree of correlation between two sequences or functions. A value of the cross-correlation formula directly reflects the correlation between the two sequences or functions, and is a measurement of sequence similarities. The cross-correlation formula includes a cross-correlation time domain formula and a cross-correlation frequency domain formula, and the cross-correlation formula may have a plurality of forms.

For example, the cross-correlation time domain formula and the cross-correlation frequency domain formula may be respectively as follows:

$$R = \frac{1}{T} \int_0^T [f_1(t)f_2(t+\tau)]d_t; \text{ and} \quad \text{Formula (1)}$$

$$R = (1/N)\sum [x(m)y(m+n)]. \quad \text{Formula (2)}$$

In Formula (1), T is a period, $f_1$ may be a primitive function of the UE, and $f_2$ may be the CP sequence in the preamble. If a value of Formula (1) is 0, it may be determined that $f_1$ and $f_2$ are not correlated. If a value of Formula (1) is not 0, a threshold K may be set based on different situations. Then, the value of Formula (1) and a value of K are compared. When the value of Formula (1) is greater than K, it is considered that $f_1$ and $f_2$ are correlated, where K may be a number greater than 0.

In Formula (2), N is a discrete value, N may be a positive integer, x(m) may be a primitive function on a UE side, and y(m+n) may be the CP sequence in a preamble sequence. If a value of Formula (2) is 0, it may be determined that x(m) and y(m+n) are not correlated. If a value of Formula (2) is not 0, K may be set based on different situations. When the value of Formula (2) is greater than K, it may be determined that x(m) and y(m+n) are correlated, where K may be a number greater than 0. For determining of a specific value of K, refer to the prior art.

In other words, if the value of either of the correlation formulas is greater than K, it may be determined that the CP sequence is detected, that is, the first preamble is detected.

Optionally, K may be configured semi-statically by the base station. For example, the base station may add a related configuration of K to RRC signaling, and send the RRC signaling to the UE.

404. If the UE detects the first preamble, the UE sends a second preamble to the base station on the first carrier.

Based on the example 1, if the UE detects the first preamble on the carrier of the PSCell of the SgNB, the UE may send the second preamble on the carrier of the PSCell of the SgNB.

In a possible design, if the UE fails to detect the first preamble when the carrier of the PSCell of the SgNB is busy, the UE needs to back off. The UE may attempt to perform access again on a next configured carrier of the PSCell.

405. The base station sends a RAR message to the UE.

Based on the example 1, further, after receiving the second preamble sent by the UE and performing corresponding processing, the SgNB may send the RAR message to the UE by using the PSCell. However, the PSCell needs to perform LBT. Therefore, the PSCell may not necessarily succeed in sending the RAR message to the UE. In a possible design, the SgNB may send the RAR message to an MgNB by using an X2 interface, so that a PCell of the MgNB sends the RAR message to the UE by using a licensed carrier. It may be understood that LBT does not need to be performed when the RAR message is sent by using the licensed carrier, thereby ensuring that the RAR message can be sent on time.

Figure 6:
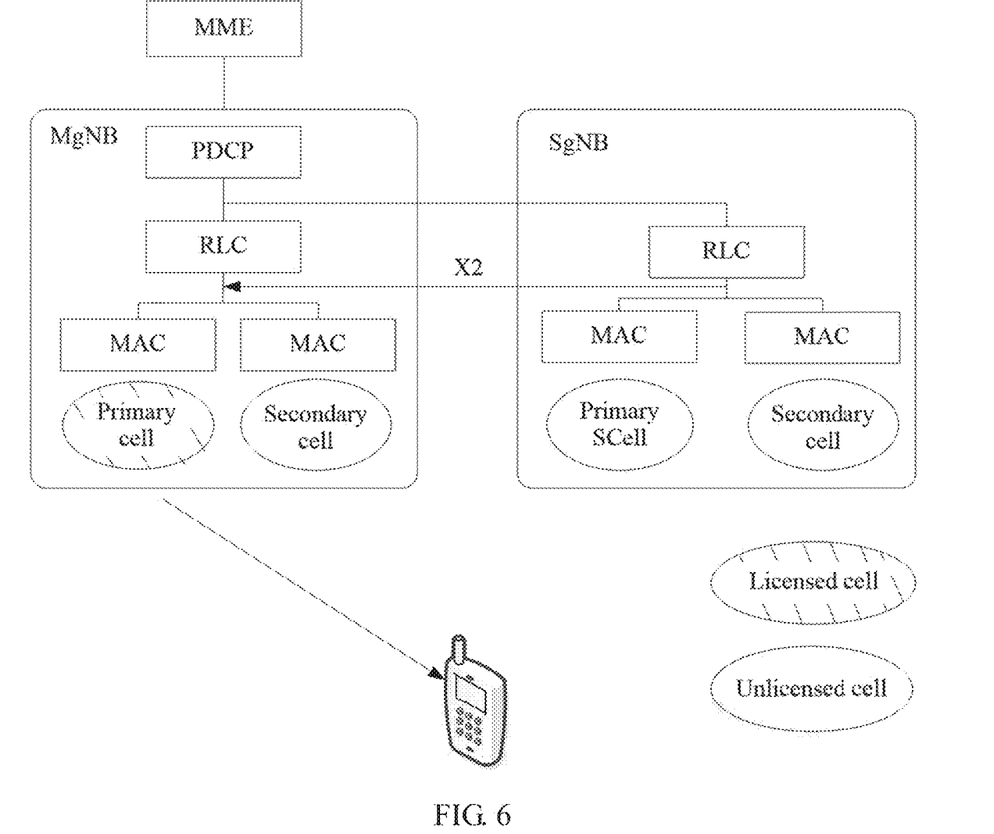
FIG. 6 is a schematic diagram of a system architecture according to an embodiment of this application.

Specifically, as shown in FIG. 6, the MgNB has a Packet Data Convergence Protocol (Packet Data Convergence Protocol. PDCP) layer, a Radio Link Control (Radio Link Control, RLC) layer, and a Media Access Control (Media Access Control, MAC) layer; and the SgNB has an RLC layer and a MAC layer. In this embodiment of this application, signaling interaction at the MAC layers is added. To be specific, the MAC layer of the SgNB sends the RRC configuration message for the UE to the MAC layer of the MgNB by using the X2 interface, so that the MgNB forwards the RRC configuration message to the UE by using the PCell.

Figure 7:
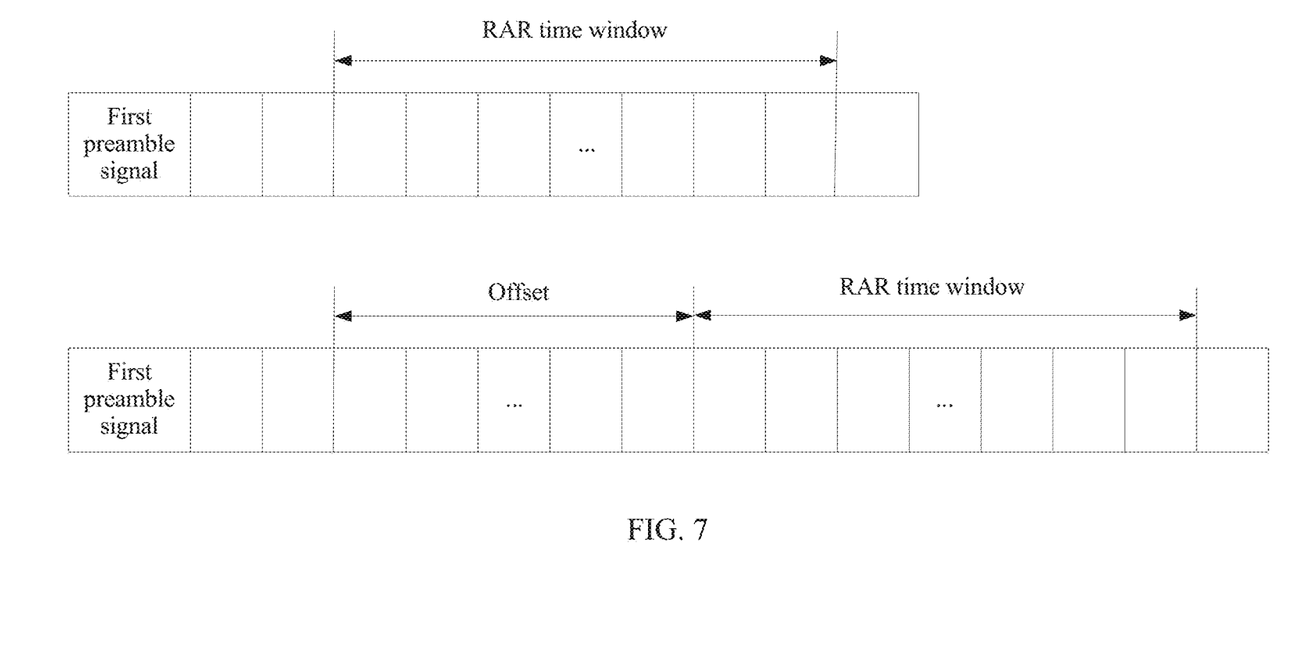
FIG. 7 is a schematic diagram of adding an offset before a RAR time window according to an embodiment of this application.

It should be noted that a delay in a process in which the SgNB sends the RAR message to the MgNB and then the MgNB transmits the RAR message to the UE by using the PCell cannot be ignored. As shown in FIG. 7, a RAR time window usually starts from a subframe for sending a preamble+3 subframes, and lasts for subframes of a quantity equal to a response window size (ra-ResponseWindowSize). Because of the delay in the process of forwarding the RAR message, a predetermined time offset (Offset) may be added to the RAR window and a specific value of the offset may be configured by using an RRC configuration message. Optionally, a specific value of the offset may be broadcast by a gNB. For example, the gNB instructs, by using a system broadcast message (for example, a SIB 2), the UE to add the predetermined offset before the random access response RAR time window.

406. The UE sends a message 3 to the base station by using a third carrier.

The third carrier includes a carrier of at least one cell in a time advanced group (Time Advanced Group, TAG) of the base station.

Based on the example 1, further, after receiving the RAR message, the UE sends the message 3 to the SgNB. The SgNB does not have a licensed carrier. Therefore, the UE needs to send the message 3 by using an unlicensed carrier. However, the UE needs to perform LBT when sending the message 3 by using the unlicensed carrier, but the LBT may not necessarily be performed successfully. To provide the UE with more opportunities of accessing a carrier to send the message 3, the SgNB may configure a plurality of carrier resources for the UE, and may receive the message 3 on carriers of a plurality of SCells. In this case, the UE may perform LBT on carriers of a plurality of SCells in a same TAG of the SgNB. If there is an idle carrier, the UE may send the message 3 on the carrier. In this way, a delay in accessing, by the UE, the carrier to send the message 3 can be reduced, and a success rate of accessing, by the UE, the carrier to send the message 3 can be improved.

407. The base station sends a message 4 to the UE.

The UE may receive the message 4 by using the first carrier, and the message 4 is received after a window of a contention resolution timer (mac-Contention Resolution Timer) is prolonged by a preset time period.

The preset time period is determined by a terminal based on a detection time required by the LBT and/or a forwarding time of the RAR message, and the forwarding time of the RAR message is used to indicate duration of forwarding the RAR message from the first carrier to a second carrier.

Based on the example 1, after the UE sends the message 3 to the SgNB, the UE starts the mac-contention resolution timer. If the UE fails to receive, before the mac-contention resolution timer expires, the message 4 sent by the SgNB, the UE considers that contention resolution fails. However, in a case of an unlicensed carrier, the SgNB can access the carrier only through LBT, and a relatively long delay is resulted from forwarding the RAR message from the SgNB to the MgNB. Consequently, the message 4 cannot be sent in a timely manner. Therefore, the window of the timer may be extended. In other words, the window of the timer is prolonged by the preset time period.

Usually, a size of the window of the timer includes a value such as subframes (subframe, sf) 8, sf16, sf24, sf32, sf40, sf48, sf56, or sf64. For example, sf8 means that the size of the window of the mac-contention resolution timer is eight subframes. For example, the window of the timer may be prolonged to sf72, sf80, sf88, sf96, sf104, or the like.

Certainly, alternatively, if the RAR message is not forwarded from the SgNB to the MgNB, the forwarding time of the RAR message may not be considered.

In this way, when the terminal performs the LBT on the first carrier, if the terminal determines, through the LBT, that the first carrier is in a busy state, the terminal may detect the first preamble signal on the first carrier. If the terminal detects the first preamble signal, the terminal may send the second preamble signal to the base station on the first carrier to attempt to access the base station. This can ensure that a plurality of terminals can simultaneously send different preamble signals on a same carrier. In comparison with the prior art in which a corresponding preamble signal cannot be sent when it is determined, through LBT, that a first carrier is in a busy state, in this embodiment of this application, a problem that a plurality of UEs cannot simultaneously send preamble signals can be resolved.

Figure 8:
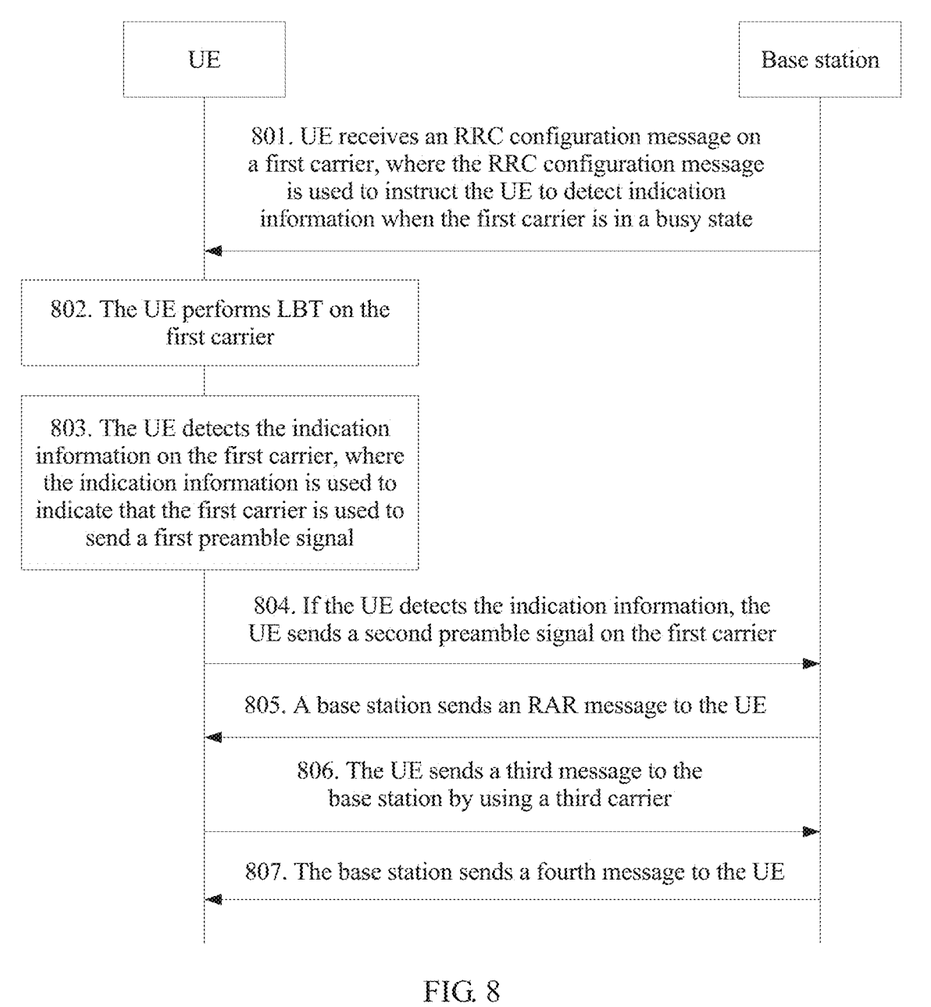
FIG. 8 is a schematic signaling interaction diagram of a random access method according to an embodiment of this application.

The following provides a random access method, and description is provided by using an example in which a terminal is UE and a first signal is indication information. As shown in FIG. 8, the method includes the following steps.

801. UE receives an RRC configuration message on a first carrier, where the RRC configuration message is used to instruct the UE to detect indication information when the first carrier is in a busy state.

In a possible design, the RRC configuration message may be further used to instruct the UE to send the indication information on the first carrier when the first carrier is in an idle state.

For example, as shown in FIG. 2, assuming that the first carrier is a carrier of a PSCell of an SgNB, the UE may receive the RRC configuration message on the carrier of the PSCell of the SgNB. The RRC configuration message is used to configure a new LBT mode of the UE. In the new LBT mode, when the UE determines, through LBT, that the carrier of the PSCell is in a busy state, the UE may further detect the indication information on the carrier of the PSCell. The indication information is used to indicate that any other UE sends a first preamble on the carrier. When the UE determines, through the LBT, that the carrier of the PSCell is in an idle state, the UE may send the indication information on the carrier of the PSCell.

In a possible design, when the new LBT mode is set to an "on" state in the RRC configuration message, it indicates that the UE uses the new LBT mode. If the new LBT mode is set to an "off" state, it indicates that the UE cannot use the new LBT mode and can use only a conventional LBT mode.

802. The UE performs LBT on the first carrier.

Figure 9:
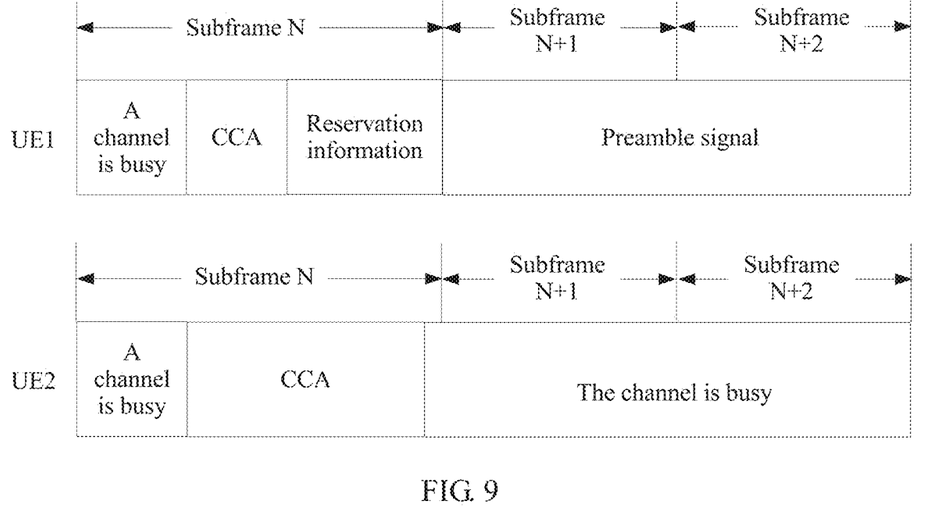
FIG. 9 is a schematic diagram of detecting indication information by UE according to an embodiment of this application.

For example, as shown in FIG. 9, when UE1 performs LBT, the UE1 may detect, on a subframe N by using CCA, whether the first carrier is idle. If it is determined that the carrier is idle, the UE1 may send a preamble on the carrier, and send indication information in reservation information (Reservation Signal). The indication information is used to notify another UE that a preamble is sent in a subframe N+1 and on a subsequent carrier. In this way, when detecting that the carrier is busy, UE2 may perform step 803, to further detect whether there is the indication information in the reservation signal.

803. The UE detects the indication information on the first carrier, where the indication information is used to indicate that the first carrier is used to send a first preamble.

For example, the indication information sent by the UE1 may be used to indicate that the UE1 sends the preamble of the UE1 on the first carrier.

The indication information may be broadcast by a base station to the UE.

804. If the UE detects the indication information, the UE sends a second preamble on the first carrier.

Based on the example in step 802, if the UE2 detects the indication information, the UE2 may send a second preamble in the subframe N+1 and on the subsequent carrier; or otherwise, the UE2 needs to perform an operation such as backoff.

805. A base station sends a RAR message to the UE.

For a specific process, refer to step 405.

806. The UE sends a message 3 to the base station by using a third carrier.

The third carrier includes a carrier of at least one cell in a time advanced group TAG of the base station.

For a specific process, refer to step 406.

807. The base station sends a message 4 to the UE.

The UE may receive the message 4 by using the first carrier, and the message 4 is received after a window of a contention resolution timer is prolonged by a preset time period.

For a specific process, refer to step 407.

In this way, when the terminal performs the LBT on the first carrier, if the terminal determines, through the LBT, that the first carrier is in a busy state, the terminal may detect the indication information on the first carrier. If the terminal detects the indication information, the terminal may send the second preamble signal to the base station on the first carrier to attempt to access the base station. This can ensure that a plurality of terminals can simultaneously send different preamble signals on a same carrier. In comparison with the prior art in which a corresponding preamble signal cannot be sent when it is determined, through LBT, that a first carrier is in a busy state, in this embodiment of this application, a problem that a plurality of UEs cannot simultaneously send preamble signals can be resolved.

The foregoing mainly describes the solutions provided in the embodiments of this application from the perspective of the terminal. It may be understood that, to implement the foregoing functions, the terminal includes a corresponding hardware structure and/or software module for performing each of the functions. A person skilled in the art should be easily aware that, algorithm steps described with reference to the embodiments disclosed in this specification can be implemented by hardware or a combination of hardware and computer software in this application. Whether the functions are performed by hardware or computer software driving hardware depends on particular applications and design constraint conditions of the technical solutions. A person skilled in the art may use different methods to implement the described functions for each particular application, but it should not be considered that the implementation goes beyond the scope of this application.

In the embodiments of this application, the terminal may be divided into functional modules based on the foregoing method examples. For example, each functional module may be obtained through division based on each function, or two or more functions may be integrated into one processing module. The integrated module may be implemented in a form of hardware, or may be implemented in a form of a software functional module. It should be noted that the module division in the embodiments of this application is an example, and is merely logical function division. There may be other division manners in actual implementation.

Figure 10:
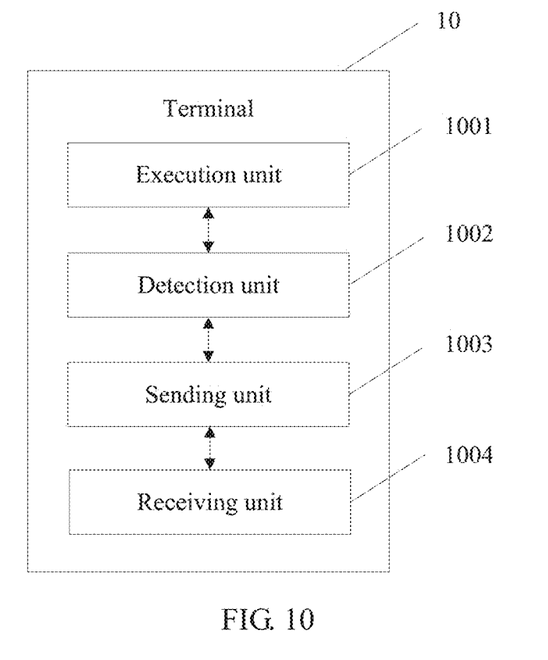
FIG. 10 is a schematic structural diagram of a terminal according to an embodiment of this application.

When each functional module is obtained through division based on each function, FIG. 10 is a possible schematic structural diagram of a terminal 10 in the foregoing embodiments. The terminal includes an execution unit 1001, a detection unit 1002, a sending unit 1003, and a receiving unit 1004. The execution unit 1001 is configured to support the terminal in performing process 402 in FIG. 4 or process 802 in FIG. 8. The detection unit 1002 is configured to support the terminal in performing process 403 in FIG. 4 or process 803 in FIG. 8. The sending unit 1003 is configured to support the terminal in performing processes 404 and 406 in FIG. 4 or processes 804 and 806 in FIG. 8. The receiving unit 1004 is configured to support the terminal in performing processes 401, 405, and 407 in FIG. 4 or processes 801, 805, and 807 in FIG. 8. All related content of steps in the foregoing method embodiments may be cited in function descriptions of corresponding functional modules. Details are not described herein.

When an integrated unit is used, FIG. 3 is a possible schematic structural diagram of a terminal in the foregoing embodiments. A terminal 3 includes a processing module 301 and a communications module 302. The processing module 301 is configured to control and manage an action of the terminal. For example, the processing module 301 is configured to support the terminal in performing the procedures 402 and 403 in FIG. 4 or the procedures 802 and 803 in FIG. 8. The communications module 302 is configured to support the terminal in communicating with another network entity, for example, communicating with a server or downloading an application installation package from a server.

The terminal may further include a storage module 303, configured to store program code and data of the terminal.

The processing module 301 may be a processor or a controller, for example, may be a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processing module may implement or execute various example logical blocks, modules, and circuits that are described with reference to the content disclosed in this application. The processor may also be a combination of processors implementing a computing function, for example, a combination of one or more microprocessors or a combination of a DSP and a microprocessor. The communications module 302 may be a transceiver, a transceiver circuit, a communications interface, or the like. The storage module 303 may be a memory.

Figure 11:
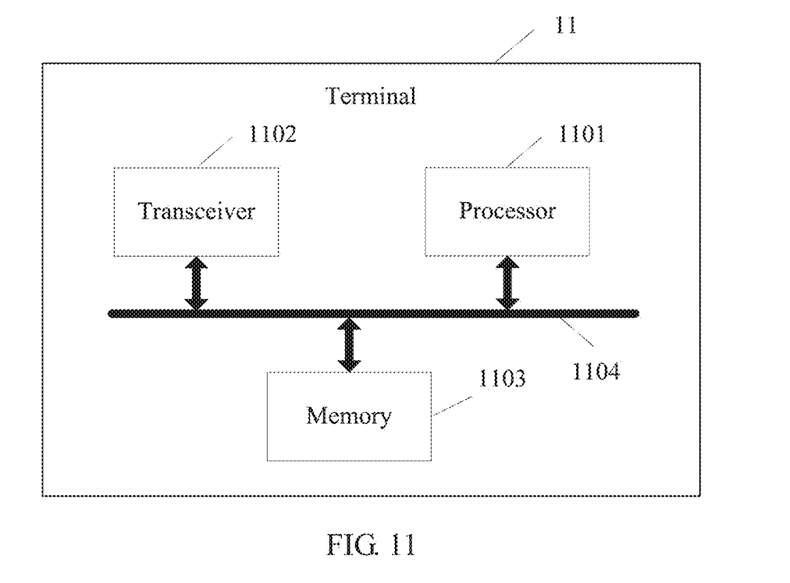
FIG. 11 is a schematic structural diagram of a terminal according to an embodiment of this application.

When the processing module 301 is a processor, the communications module 302 is a transceiver, and the storage module 303 is a memory, the terminal in the embodiments of the present invention may be a terminal shown in FIG. 11.

As shown in FIG. 11, a terminal 11 includes a processor 1101, a transceiver 1102, a memory 1103, and a bus 1104. The transceiver 1102, the processor 1101, and the memory 1103 are interconnected by using the bus 1104. The bus 1104 may be a Peripheral Component Interconnect (Peripheral Component Interconnect, PCI) bus, an Extended Industry Standard Architecture (Extended Industry Standard Architecture, EISA) bus, or the like. The bus may be categorized as an address bus, a data bus, a control bus, or the like. For ease of indication, the bus is indicated by using only one bold line in FIG. 11. However, it does not indicate that there is only one bus or only one type of bus.

The methods or algorithm steps described with reference to the content disclosed in the present invention may be implemented in a hardware manner, or may be implemented in a manner of executing a software instruction by a processor. The software instruction may include a corresponding software module. The software module may be stored in a random access memory (Random Access Memory, RAM), a flash memory, a read-only memory (Read-Only Memory, ROM), an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or a storage medium in any other forms well-known in the art. A storage medium used as an example is coupled to the processor, so that the processor can read information from the storage medium, and can write information into the storage medium. Certainly, the storage medium may be a part of the processor. The processor and the storage medium may be located in an ASIC. In addition, the ASIC may be located in a core network interface device. Certainly, the processor and the storage medium may exist in the core network interface device as discrete components.

A person skilled in the art should be aware that in one or more of the foregoing examples, the functions described in the present invention may be implemented by using hardware, software, firmware, or any combination thereof. When this application is implemented by software, these functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general-purpose or dedicated computer.

The objectives, technical solutions, and beneficial effects of the present invention are further described in detail in the foregoing specific embodiments. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:

1. A random access method, implemented by a terminal, comprising:
   performing listen before talk (LBT) on a first carrier, wherein the first carrier comprises an unlicensed carrier;
   determining, through the LBT, that the first carrier is in a busy state;
   detecting, in response to the first carrier being in the busy state, a first signal on the first carrier, wherein the first signal comprises a first preamble signal or indication information, and wherein the indication information indicates that the first carrier is for sending the first preamble signal; and
   sending, in response to the detecting, a second preamble signal on the first carrier.

2. The random access method of claim 1, wherein before performing the LBT, the random access method further comprises receiving a Radio Resource Control (RRC) configuration message from a base station, and wherein when the first carrier is in the busy state, the RRC configuration message instructs the terminal to either:
   detect the first preamble signal; or
   detect the indication information.

3. The random access method of claim 1, further comprising receiving, on a second carrier, a random access response (RAR) message from a base station, wherein the second carrier comprises a licensed carrier.

4. The random access method of claim 3, wherein before receiving the RAR message, the random access method further comprises receiving a system broadcast message from the base station, wherein the system broadcast message instructs the terminal to add a predetermined time offset before an RAR time window to receive the RAR message when the RAR time window arrives.

5. The random access method of claim 1, further comprising sending a message to a base station using a third carrier, wherein the third carrier comprises a carrier of a cell in a time advanced group (TAG) of the base station.

6. The random access method of claim 4, further comprising receiving, using the first carrier, a message from the base station after a window of a contention resolution timer is prolonged by a preset time period, wherein the preset time period is based on a detection time of the LBT or a forwarding time of the RAR message, and wherein the forwarding time of the RAR message indicates a duration of forwarding the RAR message from the first carrier to the second carrier.

7. A computer program product comprising computer-executable instructions for storage on a non-transitory computer-readable medium that, when executed by a processor, cause a terminal to:
   perform listen before talk (LBT) on a first carrier, wherein the first carrier comprises an unlicensed carrier;
   determine, through the LBT, that the first carrier is in a busy state;
   detect, in response to the first carrier being in a busy state, a first signal on the first carrier, wherein the first signal comprises a first preamble signal or indication information, and wherein the indication information indicates that the first carrier sends the first preamble signal; and
   send a second preamble signal on the first carrier.

8. The computer program product of claim 7, wherein the computer-executable instructions further cause the terminal to receive a radio resource control (RRC) configuration message from a base station, and wherein when the first carrier is in the busy state, the RRC configuration message instructs the terminal to either:
   detect the first preamble signal; or
   detect the indication information.

9. The computer program product of claim 7, wherein the computer-executable instructions further cause the terminal to receive, on a second carrier, a random access response (RAR) message from a base station, and wherein the second carrier comprises a licensed carrier.

10. The computer program product of claim 9, wherein the computer-executable instructions further cause the terminal to receive a system broadcast message from the base station, wherein the system broadcast message causes the terminal to add a predetermined time offset before an RAR time window to receive the RAR message when the RAR time window arrives.

11. The computer program product of claim 7, wherein the computer-executable instructions further cause the terminal to send a message to a base station using a third carrier, and wherein the third carrier comprises a carrier of a cell in a time advanced group (TAG) of the base station.

12. The computer program product of claim 10, wherein the computer-executable instructions further cause the terminal to receive a message from the base station using the first carrier after a window of a contention resolution timer is prolonged by a preset time period, wherein the preset time period is based on a detection time of the LBT or a forwarding time of the RAR message, and wherein the forwarding time of the RAR message indicates a duration of forwarding the RAR message from the first carrier to the second carrier.

13. A terminal, comprising:
   a bus;
   a transceiver coupled to the bus and configured to perform listen before talk (LBT) on a first carrier, wherein the first carrier comprises an unlicensed carrier; and
   a processor coupled to the bus and configured to:
      determine, through the LBT, that the first carrier is in a busy state;
      detect, in response to the first carrier being in a busy state, a first signal on the first carrier, wherein the first signal comprises a first preamble signal or indication information, and wherein the indication information indicates that the first carrier sends the first preamble signal; and
   send a second preamble signal on the first carrier.

14. The terminal of claim 13, wherein the transceiver is further configured to receive a radio resource control (RRC)

configuration message from a base station, and wherein when the first carrier is in the busy state, the RRC configuration message instructs the terminal to either:
  detect the first preamble signal; or
  detect the indication information.

15. The terminal of claim 13, wherein the transceiver is further configured to receive, on a second carrier, a random access response (RAR) message from a base station, and wherein the second carrier comprises a licensed carrier.

16. The terminal of claim 15, wherein the transceiver is further configured to receive a system broadcast message from the base station, and wherein the system broadcast message causes the terminal to add a predetermined time offset before an RAR time window to receive the RAR message when the RAR time window arrives.

17. The terminal of claim 13, wherein the transceiver is further configured to send a message to a base station using a third carrier, and wherein the third carrier comprises a carrier of a cell in a time advanced group (TAG) of the base station.

18. The terminal of claim 16, wherein the transceiver is further configured to receive a message from the base station using the first carrier after a window of a contention resolution timer is prolonged by a preset time period, wherein the preset time period is based on a detection time of the LBT or a forwarding time of the RAR message, and wherein the forwarding time of the RAR message indicates a duration of forwarding the RAR message from the first carrier to the second carrier.

19. The terminal of claim 14, wherein the transceiver is further configured to receive a system broadcast message from the base station, wherein the system broadcast message causes the terminal to add a predetermined time offset before a random access response (RAR) time window to receive an RAR message when the RAR time window arrives.

20. The terminal of claim 15, wherein the transceiver is further configured to receive a system broadcast message from the base station, wherein the system broadcast message causes the terminal to add a predetermined time offset before an RAR time window to receive the RAR message when the RAR time window arrives.

* * * * *

UNITED STATES PATENT AND TRADEMARK OFFICE
CERTIFICATE OF CORRECTION

PATENT NO. : 10,999,875 B2
APPLICATION NO. : 16/608508
DATED : May 4, 2021
INVENTOR(S) : Xiaocui Li et al.

It is certified that error appears in the above-identified patent and that said Letters Patent is hereby corrected as shown below:

On the Title Page

Page 2, Column 2, Line 1 References Cited, Other Publications: "3GPP TS 36321 V14.2.0" should read "3GPP TS 36.321 V14.2.0"

Page 2, Column 2, Line 6 References Cited, Other Publications: "3GPP TS 36331 V14.2.2" should read "3GPP TS 36.331 V14.2.2"

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*